(12) United States Patent
Ravindran et al.

(10) Patent No.: US 12,452,901 B2
(45) Date of Patent: Oct. 21, 2025

(54) OPTIMAL GRANT FOR VoNR VoLTE USING FORWARD LEARNING OF CODEC RATE

(71) Applicant: Rakuten Symphony, Inc., Tokyo (JP)

(72) Inventors: Gopi Ravindran, Bangalore (IN); Haresh Damodaran, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/012,773

(22) PCT Filed: Nov. 23, 2022

(86) PCT No.: PCT/US2022/050873
§ 371 (c)(1),
(2) Date: Dec. 23, 2022

(87) PCT Pub. No.: WO2024/112336
PCT Pub. Date: May 30, 2024

(65) Prior Publication Data
US 2024/0323998 A1 Sep. 26, 2024

(51) Int. Cl.
*H04W 72/543* (2023.01)
*H04W 72/11* (2023.01)
(52) U.S. Cl.
CPC .......... *H04W 72/543* (2023.01); *H04W 72/11* (2023.01)

(58) Field of Classification Search
CPC ... H04W 72/543; H04W 72/11; H04W 72/04; H04W 72/1263; H04W 24/10; H04W 72/0413; H04W 72/21; H04W 76/048; H04W 76/28
See application file for complete search history.

(56) References Cited

U.S. PATENT DOCUMENTS

| | | | |
|---|---|---|---|
| 2008/0144568 A1 | 6/2008 | Usuda et al. | |
| 2013/0083702 A1 | 4/2013 | Barany et al. | |
| 2015/0382372 A1* | 12/2015 | Vajapeyam | H04W 72/1263 370/329 |
| 2019/0200330 A1* | 6/2019 | Wikström | H04W 76/11 |
| 2019/0349116 A1* | 11/2019 | Hosseini | H04L 1/0011 |

OTHER PUBLICATIONS

International Search Report issued Apr. 5, 2023 in International Application No. PCT/US 22/50873.
Written Opinion issued Apr. 5, 2023 in International Application No. PCT/US 22/50873.

* cited by examiner

*Primary Examiner* — Rushil P. Sampat
(74) *Attorney, Agent, or Firm* — Sughrue Mion, PLLC

(57) ABSTRACT

A method of semi-persistent scheduling (SPS) in a wireless network may include setting a current SPS transport block size (TBS), compressing a data packet, determining whether to adjust the current SPS TBS based on a size of the compressed data packet, and adjusting the current SPS TBS to a subsequent SPS TBS that is less than the current SPS TBS based on determining to adjust the current SPS TBS.

20 Claims, 5 Drawing Sheets

OPTIMAL GRANT FOR VoNR VoLTE USING FORWARD LEARNING OF CODEC RATE

CROSS REFERENCE TO RELATED APPLICATIONS

This Application is a National Stage of International Application No. PCT/US2022/050873 filed Nov. 23, 2022.

BACKGROUND

1. Field

Apparatuses and methods consistent with example embodiments of the present disclosure relate to a method of semi-persistent scheduling (SPS) in a wireless network.

2. Description of Related Art

In related art semi-persistent scheduling (SPS) in a wireless network, an SPS transport bit size (TBS) may be set based on a guaranteed bit rate (GBR) of the wireless network. The SPS TBS may be set as a value of bits corresponding to an individual data packet. However, the individual data packet may be generated according to the SPS TBS while the data is uncompressed. After compression, the size of the individual data packet may be reduced below the size of the SPS TBS, resulting in unused resources. That is, in current $4^{th}$ generation (4G) and $5^{th}$ generation (5G) networks, layer 2 does not include any functionality for saving resources in terms of bit rate or packet size.

SUMMARY

According to embodiments, systems and methods are provided for semi-persistent scheduling (SPS) in a wireless network, where the bit rate required per user may be reduced, and unused resources created by data compression may be identified and utilized.

According to an aspect of the disclosure, a method of SPS in a wireless network may include setting a current SPS transport block size (TBS), compressing a data packet, determining whether to adjust the current SPS TBS based on a size of the compressed data packet, and adjusting the current SPS TBS to a subsequent SPS TBS that is less than the current SPS TBS based on determining to adjust the current SPS TBS.

According to an aspect of the disclosure, a system for SPS in a wireless network may include at least one memory storing instructions, and at least one processor configured to execute the instructions to set a current SPS TBS, compress a data packet, determine whether to adjust the current SPS TBS based on a size of the compressed data packet and adjust the current SPS TBS to a subsequent SPS TBS that is less than the current SPS TBS based on determining to adjust the current SPS TBS.

According to an aspect of the disclosure, a non-transitory computer-readable storage medium may store instructions that, when executed by at least one processor, cause the at least one processor to set a current SPS TBS, compress a data packet, determine whether to adjust the current SPS TBS based on a size of the compressed data packet and adjust the current SPS TBS to a subsequent SPS TBS that is less than the current SPS TBS based on determining to adjust the current SPS TBS.

BRIEF DESCRIPTION OF THE DRAWINGS

Features, advantages, and significance of exemplary embodiments of the disclosure will be described below with reference to the accompanying drawings, in which like signs denote like elements, and wherein.

DETAILED DESCRIPTION

Figure 1:
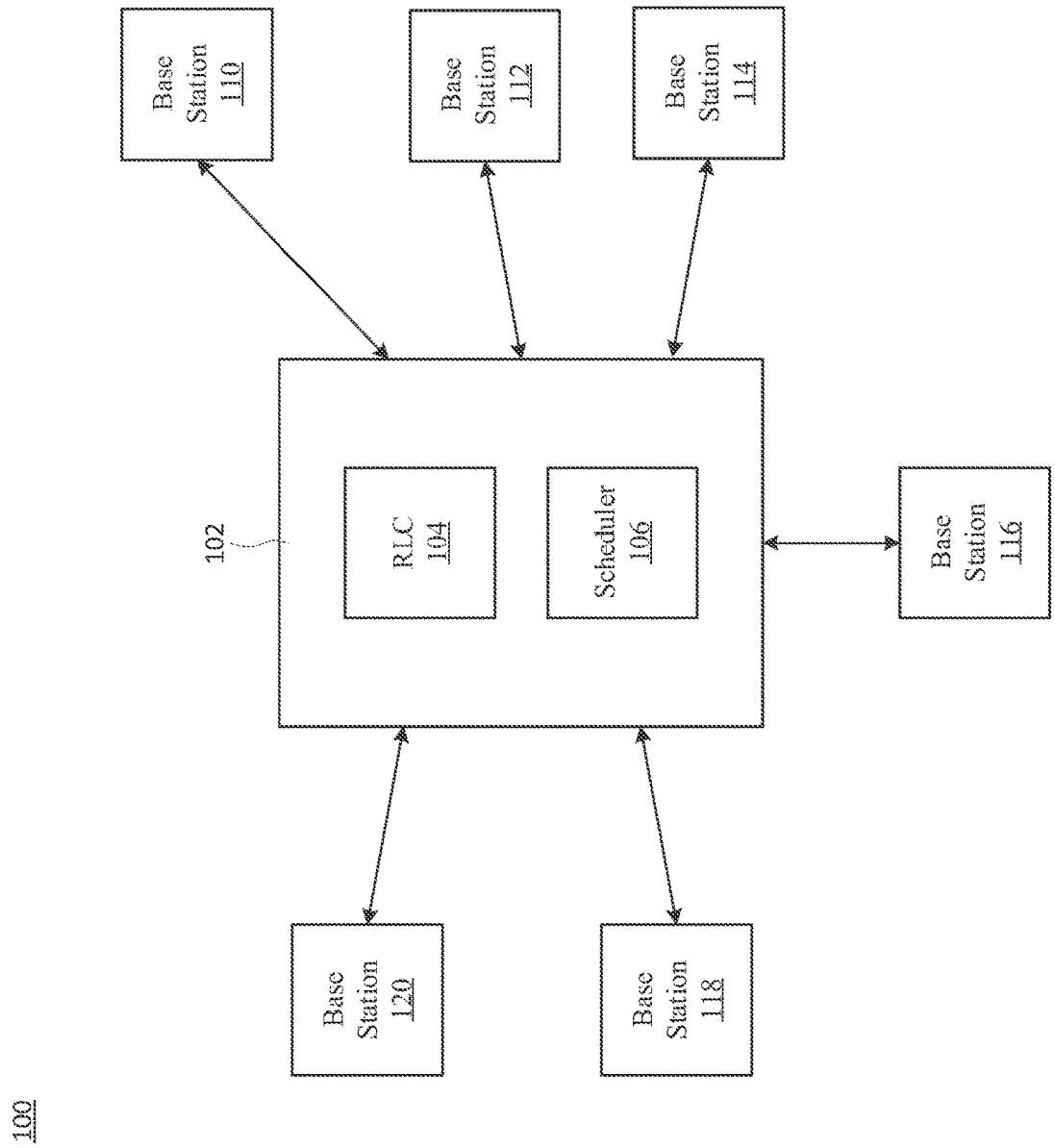
FIG. 1 is a diagram of a wireless network implementing semi-persistent scheduling (SPS), according to an embodiment.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms.

Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments of the present disclosure provide a method and system of semi-persistent scheduling (SPS) in a wireless network, where an SPS transport block size (TBS) (e.g., transport block (TB) size, data packet size, etc.) may be configured and adjusted. In particular, the system may set a current SPS TBS, compress a data packet, determine whether to adjust the current SPS TBS based on a size of the compressed data packet, and adjust the current SPS TBS to a subsequent SPS TBS that is less than or greater than the current SPS TBS based on determining to adjust the current SPS TBS. That is, the SPS TBS may either be increased or decreased based on the current compression ratio.

While the uncompressed data packet may have an initial size, after compression, the size of the compressed data packet may be a value that is less than the SPS TBS (e.g., in robust header compression (RoHC) systems, the compression rate may vary). As a result, the remaining bits of the data packet (e.g., remaining physical resource blocks (PRBs)) may go unused, resulting in data use inefficiency. Thus, the provided system and method may determine to adjust the SPS TBS based on the size of the compressed data packet in comparison with the SPS TBS, as is described in detail below. The provided systems and methods may therefore reduce a bit rate required per user (or otherwise increase a bit rate as may be indicated by the compression ratio) while also realizing the RoHC compression benefits in over-the-air resource allocation in SPS for $4^{th}$ generation (4G) networks, $5^{th}$ generation (5G) networks, as well as other networks that will be understood by one of ordinary skill in the art from the disclosure herein.

FIG. 1 is a diagram of a wireless network 100 implementing SPS, according to an embodiment. The wireless network 100 may include a base station 102, and a plurality of user devices 110-120 connected to the base station 102. The base station 102 may include a radio link control (RLC) 104 and a scheduler 106. The base station 102, via the RLC 104, may be configured to prepare TBs/data packets in downlink, and decode TBs/data packets in uplink. The base station 102 may also be configured to compress data packets. As is described below, the RLC 104 may be configured to, while en-queuing or de-queuing data packets, determine a runtime average of the size of data packets after RoHC compression to determine an effective codec rate (e.g., an reduction in SPS TBS). The determination may be fed from the RLC 104 to the scheduler 106 to adjust the SPS TBS.

An initial SPS TBS may be configured based on a guaranteed bit rate (GBR). In example embodiments where the GBR for the wireless network 100 is configured for 40 Kbps (e.g., for adaptive multi-rate wideband (AMR-WB) 12.65 Kbps), the initial SPS TBS may be set as 800 bits per grant (e.g., 800 bits per data packet) to satisfy the corresponding GBR. Although embodiments disclosed herein will be described with respect to a wireless network with an SPS TBS of 800 bits, the embodiments are not limited to this specific configuration. Furthermore, the embodiments disclosed herein may be performed by the base station 104 and/or a core network corresponding to the wireless network 100 (e.g., a server device).

The system may set an SPS periodicity value for the wireless network 100 (i.e., sps_periodicity). The SPS periodicity value may be preconfigured for the wireless network 100 or may be selected based on other factors of the wireless network 100. In the example embodiment disclosed herein, the SPS periodicity value may be et to 20 ms. Furthermore, the system may set a number of packets per second (i.e., packet_per_sec). The number of packets per second may be determined based on the value of one second divided by the SPS periodicity value. That is, in the example embodiment disclosed herein, the number of packets per second may be set as 50. The system may further determine a number of packets per SPS grant (i.e., number_of_packets_per_sps_grant). The number of packets per SPS grant may correspond to the number of data packets that are including in an uplink/downlink transmission. The number of packets per SPS grant may be determined based on dividing the SPS periodicity value by a predetermined, fixed value. In the example embodiment disclosed herein, the number of packets per SPS grant may be determined based on dividing the SPS periodicity by a fixed value of 20 (i.e., number_of_packets_per_sps_grant=1).

The system may initialize the SPS TBS (i.e., SPS TBS). The initial SPS TBS may be set based on a GBR of the wireless network (i.e., guaranteed_bit_rate), the number of packets per second, and the number of packets per SPS grant. That is, the initial SPS TBS may be configured based on Equation (1).

$$(\text{guaranteed\_bit\_rate}/\text{packet\_per\_sec}) * \text{number\_of\_packets\_per\_sps\_grant} \qquad (1)$$

As described below, a current SPS TBS may be an initial SPS TBS, or a subsequent SPS TBS that is adjusted from the initial SPS TBS, as will be described below.

The system may further configure a predetermined hysteresis bit value (i.e., sps_tbs_hysteresis) that may be used to determine whether to adjust the SPS TBS. The predetermined hysteresis bit value may be a value that represents a difference between the SPS TBS and a size of a compressed data packet. The predetermined hysteresis bit value may be a static value or dynamic value that is adjusted based on system parameters. For example, as the difference between a current SPS TBS and the compressed data packet size decreases, the predetermined hysteresis bit value may be reduced to ensure that further adjustments to the SPS TBS may be performed. In the example embodiment disclosed herein, the predetermined hysteresis bit value may be set at 80 bits. That is, as will be described below, the system may determine to adjust the current SPS TBS when the difference between the current SPS TBS and the size of the compressed data packet is greater than (or equal to) 80 bits.

Then, the system may determine whether to adjust the current SPS TBS. The system may determine whether to adjust the current SPS TBS for each data packet de-queued in downlink and/or for each packet en-queued in uplink. Furthermore, the system may determine whether to adjust the current SPS TBS at predetermined intervals of data packets being en-queued/de-queued (e.g., every two data packets, every five data packets, etc.).

The system may first determine a type of a de-queued/en-queued data packet. For example, the system may determine to not adjust the current SPS TBS when the data packet is a packet data convergence protocol (PDCP) control packet, when the data packet is an RoHC feedback packet, and/or when the data packet is a silence indicator descriptor (SID) packet. When the data packet is not an PDCP control packet, an RoHC feedback packet, and/or an SID packet (or alternatively, the system may forego the determination of the type of data packet), the system may determine to adjust the current SPS TBS.

The system may determine a new (e.g., subsequent) SPS TBS (i.e., new_sps_tbs). The new SPS TBS may be determined based on the current SPS TBS multiplied by a first percentage value (i.e., p1) and the size of the compressed data packet (i.e., packet_size_in_bits) multiplied by a second percentage value (i.e., p2). That is, the new SPS TBS may be determined as in Equation (2).

$$\text{new\_sps\_tbs} = (p1 * \text{sps\_tbs}) + (p2 * \text{packet\_size\_in\_bits}) \quad (2)$$

The first percentage value p1 may be greater than the second percentage value p2. In an example embodiment, the percentage value p1 may be 90% (e.g., 0.9) and the percentage value p2 may be 10% (e.g., 0.1), although other percentage values may be utilized and adjusted based on the needs of the wireless network 100.

Based on the new SPS TBS, the system may further determine whether to adjust the current SPS TBS. For example, the system may determine to adjust the current SPS TBS based on the new SPS TBS and the predetermined hysteresis bit value. That is, the system may determine to adjust the current SPS TBS to the new SPS TBS when a summation of the new SPS TBS and the predetermined hysteresis bit value is greater than the current SPS TBS, or when a difference between the new SPS TBS and the predetermined hysteresis bit value is less than the current SPS TBS, or, as in Equation (3):

$$\text{if (new\_sps\_tbs + sps\_tbs\_hysteresis)} > \text{sps\_tbs OR} \quad (3)$$
$$(\text{new\_sps\_tbs} - \text{sps\_tbs\_hysteresis}) < \text{sps\_tbs}$$

When the system determines to adjust the current SPS TBS to the new SPS TBS, the system may update the current SPS TBS to be the new SPS TBS, and may send the update to the scheduler 106.

Figure 2:
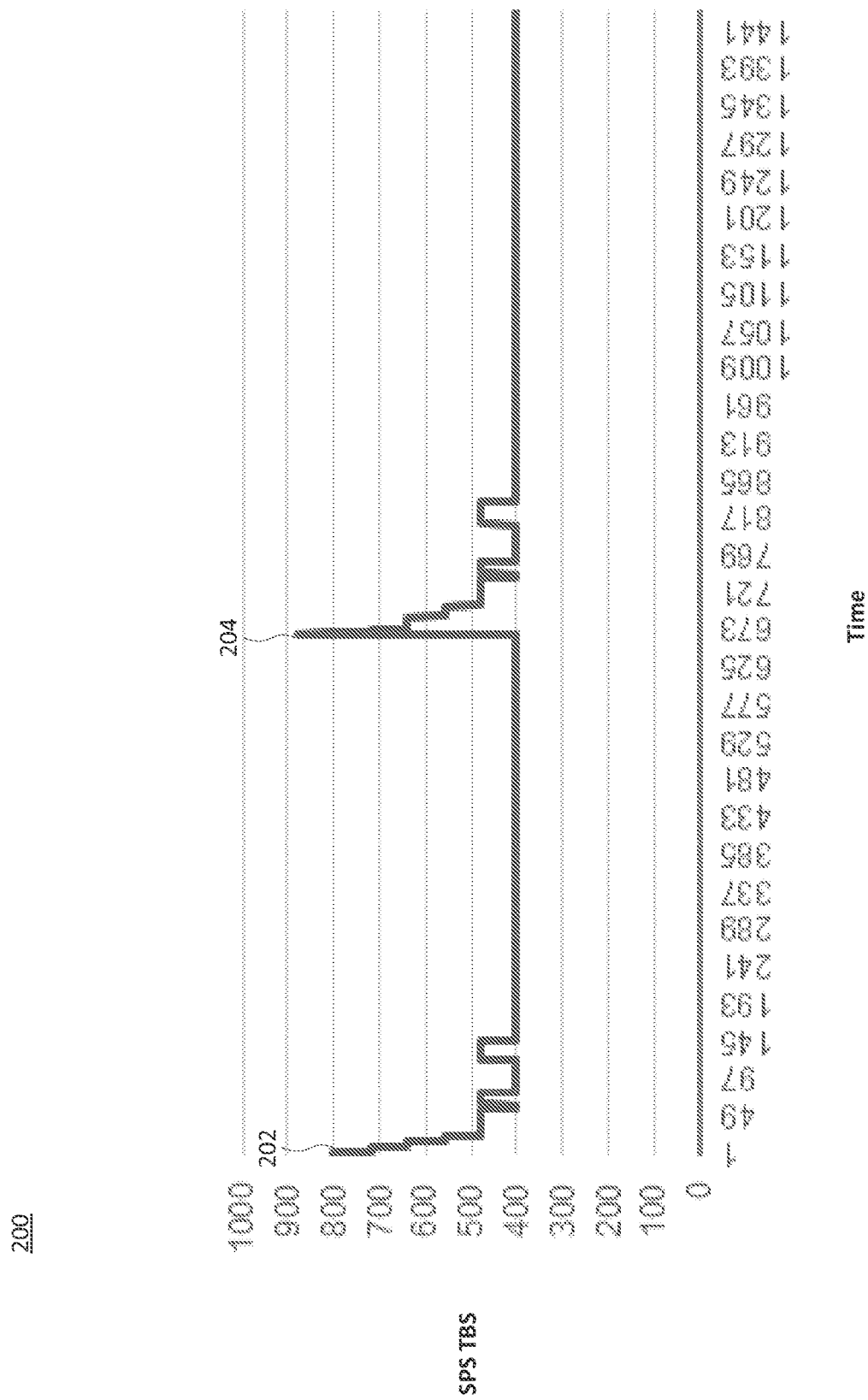
FIG. 2 is a graph showing an SPS transport block size (TBS) size over time according to an embodiment

FIG. 2 is a graph 200 showing an SPS TBS size over time according to an embodiment. FIG. 2 is produced from a wireless network where the current SPS TBS (or the initial SPS TBS) is set to 800 bits. At time point 202, the system may start data packet processing. As shown through further time points, the SPS TBS gradually reduces to 400 bits, or half the initial SPS TBS at time point 202. Once the SPS TBS reaches about 400 bits, the difference between the SPS TBS and the size of the compressed data packets may not exceed the predetermined hysteresis bit value, and thus, no further adjustments to the SPS TBS are made. At time point 204, the system may reset the SPS TBS, or a new session occurs which results in the SPS TBS being reset to a value of 900 bits. As shown in graph 200, the SPS TBS reduces in size over time to about 400 bits, and then remains at 400 bits.

Figure 3:
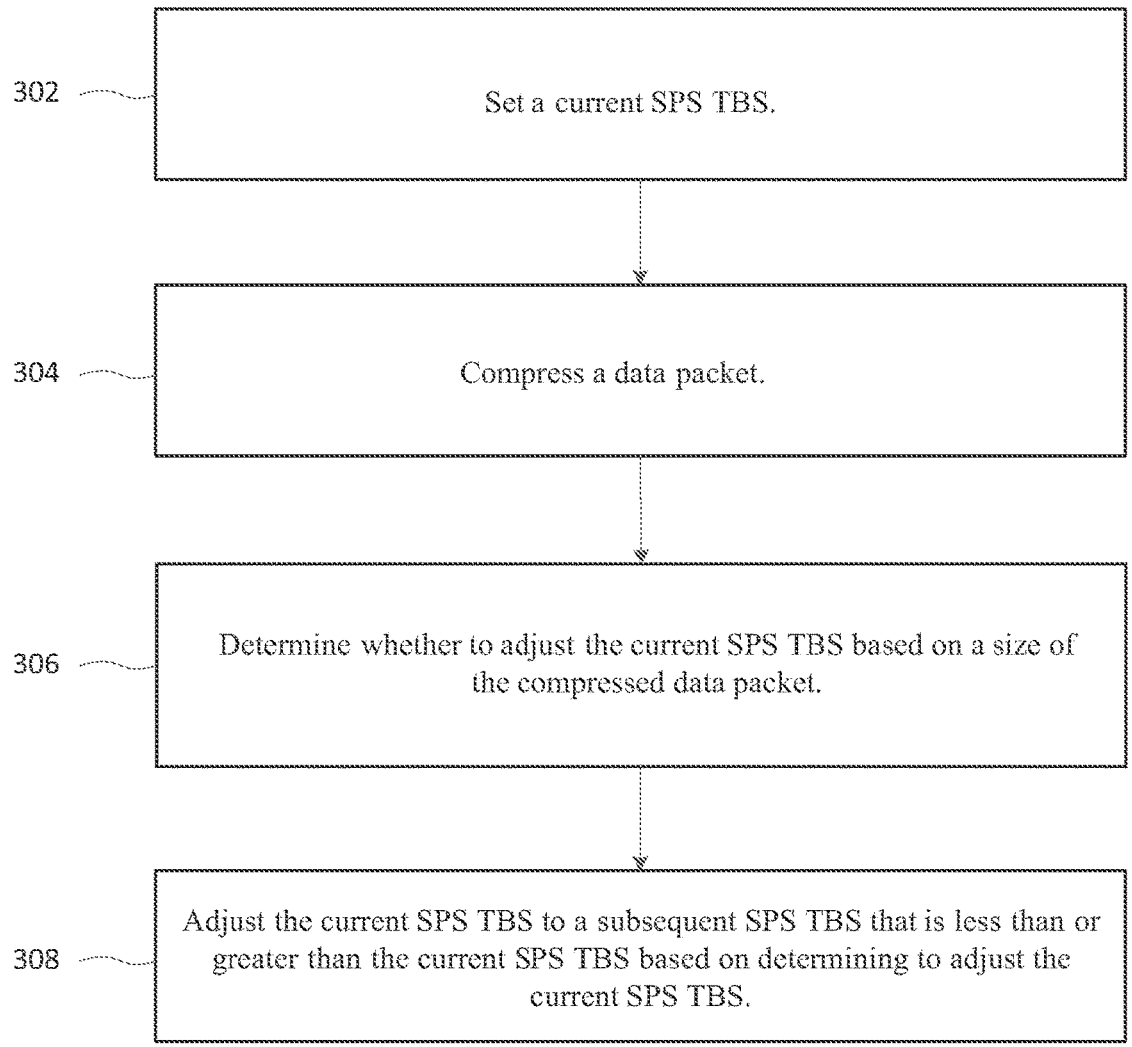
FIG. 3 is a flowchart of a method of SPS in a wireless network, according to an embodiment.

FIG. 3 is a flowchart of a method of SPS in a wireless network, according to an embodiment. In operation 302, the system may set a current SPS TBS. In operation 304, the system may compress a data packet. In operation 306, the system may determine whether to adjust the current SPS TBS based on a size of the compressed data packet. In operation 308, the system may adjust the current SPS TBS to a subsequent SPS TBS that is less than or greater than the current SPS TBS based on determining to adjust the current SPS TBS. That is, the SPS TBS may either be increased or decreased based on the current compression ratio.

Figure 4:
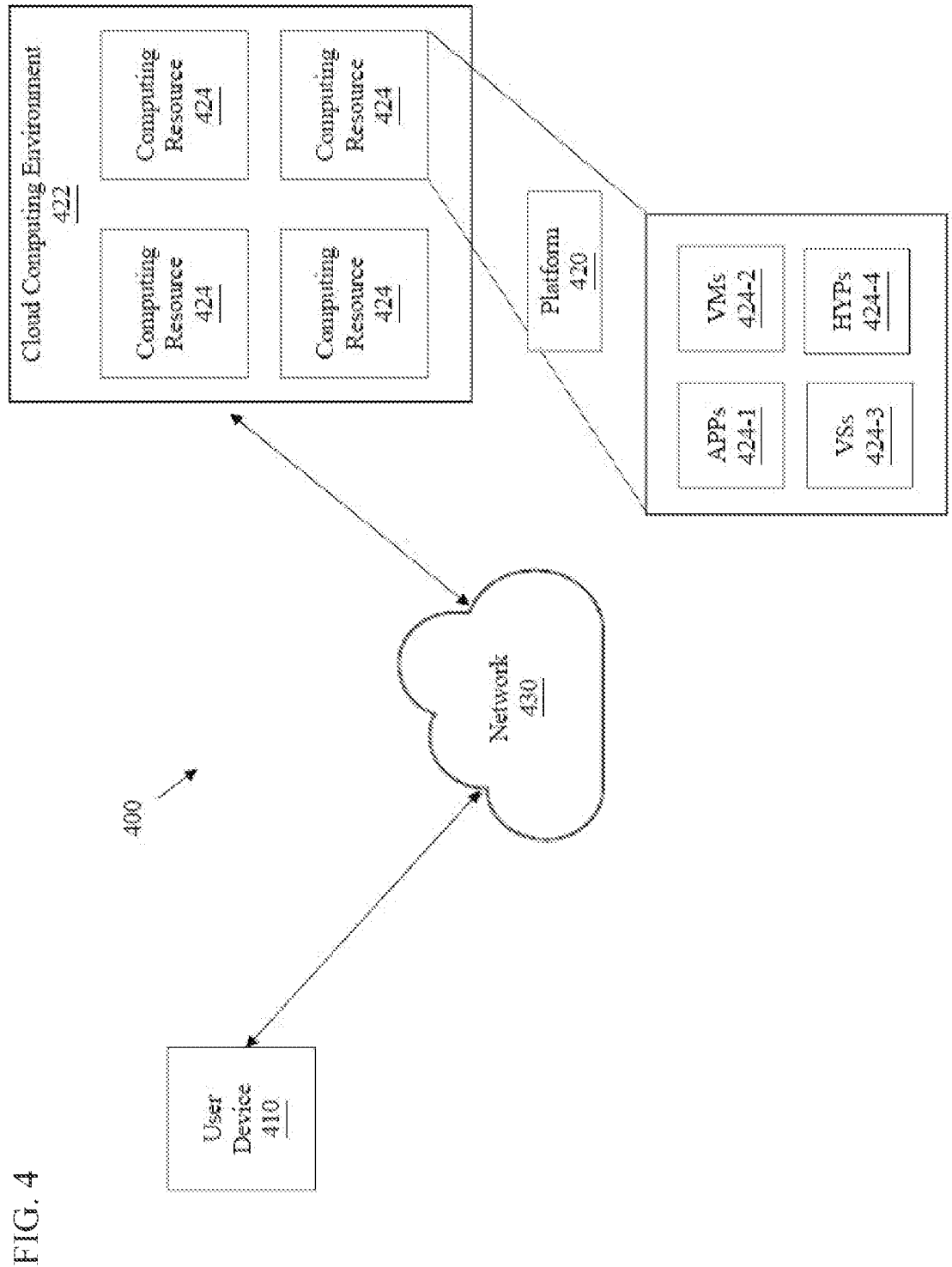
FIG. 4 is a diagram of an example environment in which systems and/or methods, described herein, may be implemented.

FIG. 4 is a diagram of an example environment 400 in which systems and/or methods, described herein, may be implemented. As shown in FIG. 4, environment 400 may include a user device 410, a platform 420, and a network 430. Devices of environment 400 may interconnect via wired connections, wireless connections, or a combination of wired and wireless connections. In embodiments, any of the functions and operations described with reference to FIG. 1 above may be performed by any combination of elements illustrated in FIG. 4.

User device 410 includes one or more devices capable of receiving, generating, storing, processing, and/or providing information associated with platform 420. For example, user device 410 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 410 may receive information from and/or transmit information to platform 420.

Platform 420 includes one or more devices capable of receiving, generating, storing, processing, and/or providing information. In some implementations, platform 420 may include a cloud server or a group of cloud servers. In some implementations, platform 420 may be designed to be modular such that certain software components may be swapped in or out depending on a particular need. As such, platform 420 may be easily and/or quickly reconfigured for different uses.

In some implementations, as shown, platform 420 may be hosted in cloud computing environment 422. Notably, while implementations described herein describe platform 420 as being hosted in cloud computing environment 422, in some implementations, platform 420 may not be cloud-based (i.e., may be implemented outside of a cloud computing environment) or may be partially cloud-based.

Cloud computing environment 422 includes an environment that hosts platform 420. Cloud computing environment 422 may provide computation, software, data access, storage, etc. services that do not require end-user (e.g., user device 410) knowledge of a physical location and configuration of system(s) and/or device(s) that hosts platform 420. As shown, cloud computing environment 422 may include a group of computing resources 424 (referred to collectively as "computing resources 424" and individually as "computing resource 424").

Computing resource 424 includes one or more personal computers, a cluster of computing devices, workstation computers, server devices, or other types of computation and/or communication devices. In some implementations, computing resource 424 may host platform 420. The cloud resources may include compute instances executing in computing resource 424, storage devices provided in computing resource 424, data transfer devices provided by computing resource 424, etc. In some implementations, computing resource 424 may communicate with other computing resources 424 via wired connections, wireless connections, or a combination of wired and wireless connections.

As further shown in FIG. 4, computing resource 424 includes a group of cloud resources, such as one or more applications ("APPs") 424-1, one or more virtual machines ("VMs") 424-2, virtualized storage ("VSs") 424-3, one or more hypervisors ("HYPs") 424-4, or the like.

Application 424-1 includes one or more software applications that may be provided to or accessed by user device 410. Application 424-1 may eliminate a need to install and execute the software applications on user device 410. For example, application 424-1 may include software associated with platform 420 and/or any other software capable of being provided via cloud computing environment 422. In some implementations, one application 424-1 may send/receive information to/from one or more other applications 424-1, via virtual machine 424-2.

Virtual machine 424-2 includes a software implementation of a machine (e.g., a computer) that executes programs like a physical machine. Virtual machine 424-2 may be either a system virtual machine or a process virtual machine, depending upon use and degree of correspondence to any real machine by virtual machine 424-2. A system virtual machine may provide a complete system platform that supports execution of a complete operating system ("OS"). A process virtual machine may execute a single program, and may support a single process. In some implementations, virtual machine 424-2 may execute on behalf of a user (e.g., user device 410), and may manage infrastructure of cloud computing environment 422, such as data management, synchronization, or long-duration data transfers.

Virtualized storage 424-3 includes one or more storage systems and/or one or more devices that use virtualization techniques within the storage systems or devices of computing resource 424. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 424-4 may provide hardware virtualization techniques that allow multiple operating systems (e.g., "guest operating systems") to execute concurrently on a host computer, such as computing resource 424. Hypervisor 424-4 may present a virtual operating platform to the guest operating systems, and may manage the execution of the guest operating systems. Multiple instances of a variety of operating systems may share virtualized hardware resources.

Network 430 includes one or more wired and/or wireless networks. For example, network 430 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
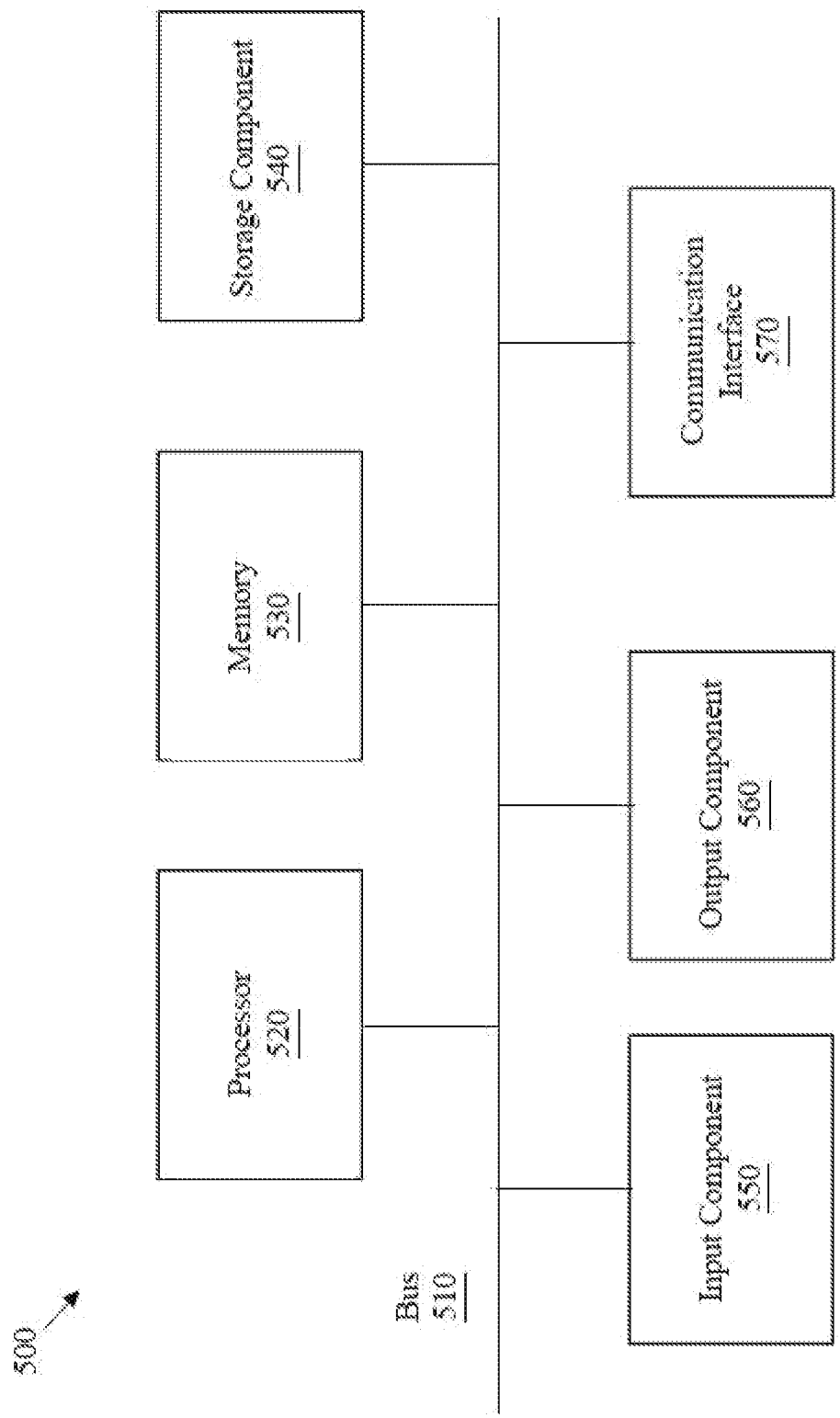
FIG. 5 is a diagram of example components of a device according to an embodiment

FIG. 5 is a diagram of example components of a device 500. Device 500 may correspond to user device 410 and/or platform 420. As shown in FIG. 5, device 500 may include a bus 510, a processor 520, a memory 530, a storage component 540, an input component 550, an output component 560, and a communication interface 570.

Bus 510 includes a component that permits communication among the components of device 500. Processor 520 may be implemented in hardware, firmware, or a combination of hardware and software. Processor 520 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 550 includes a component that permits device 500 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator). Output component 560 includes a component that provides output information from device 500 (e.g., a display, a speaker, and/or one or more light-emitting diodes (LEDs)).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, or the like.

Device 500 may perform one or more processes described herein. Device 500 may perform these processes in response to processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

In embodiments, any one of the operations or processes of FIGS. 1, 2 and 3 may be implemented by or using any one of the elements illustrated in FIGS. 4 and 5.

According to example embodiments, an initial or current SPS TBS may be adjusted based on a size of a compressed data packet, such that unused resources of the compressed data packet may be utilized.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method of semi-persistent scheduling (SPS) in a wireless network, the method comprising:
   setting a current SPS transport block size (TBS);
   compressing a data packet;
   determining whether to adjust the current SPS TBS based on a size of the compressed data packet; and
   adjusting a value of the current SPS TBS to be a value of a subsequent SPS TBS that is less than the current SPS TBS based on determining to adjust the current SPS TBS.

2. The method of claim 1, wherein the current SPS TBS is set based on a guaranteed bit rate of the wireless network.

3. The method of claim 1, further comprising configuring a predetermined hysteresis bit value representing a difference between an SPS TBS and a size of a compressed data packet.

4. The method of claim 3, wherein determining whether to adjust the current SPS TBS comprises determining to adjust the current SPS TBS based on a difference between the current SPS TBS and the size of the compressed data packet being greater than the predetermined hysteresis bit value.

5. The method of claim 4, wherein the current SPS TBS is further determined to be adjusted based on a summation of the subsequent SPS TBS and the predetermined hysteresis bit value being greater than the current SPS TBS, or based on a difference between the subsequent SPS TBS and the predetermined hysteresis bit value being less than the current SPS TBS.

6. The method of claim 3, wherein determining whether to adjust the current SPS TBS comprises determining to not adjust the current SPS TBS based on at least one of:
   a difference between the current SPS TBS and the size of the compressed data packet being less than or equal to the predetermined hysteresis bit value,
   a summation of the subsequent SPS TBS and the predetermined hysteresis bit value being less than or equal to the current SPS TBS, and
   a difference between the subsequent SPS TBS and the predetermined hysteresis bit value being greater than or equal to the current SPS TBS.

7. The method of claim 1, wherein determining whether to adjust the current SPS TBS comprises determining to not adjust the current SPS TBS based on the data packet being at least one of:
   a packet data convergence protocol (PDCP) control packet;
   a robust header compression (RoHC) feedback packet; and
   a silence indicator descriptor (SID) packet.

8. The method of claim 1, wherein the subsequent SPS TBS is determined based on a summation of the current SPS TBS multiplied by a first percentage value and the size of the compressed data packet multiplied by a second percentage value.

9. The method of claim 8, wherein the first percentage value is greater than the second percentage value.

10. The method of claim 1, further comprising de-queuing the compressed first data packet,
    wherein determining whether to adjust the current SPS TBS is performed after the compressed data packet is de-queued.

11. A system for of semi-persistent scheduling (SPS) in a wireless network, the system comprising:
    at least one memory storing instructions; and
    at least one processor configured to execute the instructions to:
      set a current SPS transport block size (TBS);
      compress a data packet;
      determine whether to adjust the current SPS TBS based on a size of the compressed data packet; and
      adjust a value of the current SPS TBS to be a value of a subsequent SPS TBS that is less than the current SPS TBS based on determining to adjust the current SPS TBS.

12. The system of claim 11, wherein the current SPS TBS is set based on a guaranteed bit rate of the wireless network.

13. The system of claim 11, wherein the at least one processor is further configured to execute the instructions to configure a predetermined hysteresis bit value representing a difference between an SPS TBS and a size of a compressed data packet.

14. The system of claim 13, wherein the at least one processor is further configured to execute the instructions to determine whether to adjust the current SPS TBS by determining to adjust the current SPS TBS based on a difference between the current SPS TBS and the size of the compressed data packet being greater than the predetermined hysteresis bit value.

15. The system of claim 14, wherein the current SPS TBS is further determined to be adjusted based on a summation of the subsequent SPS TBS and the predetermined hysteresis bit value being greater than the current SPS TBS, or based on a difference between the subsequent SPS TBS and the predetermined hysteresis bit value being less than the current SPS TBS.

16. The system of claim 13, wherein the at least one processor is further configured to execute the instructions to determine whether to adjust the current SPS TBS by determining to not adjust the current SPS TBS based on at least one of:
  a difference between the current SPS TBS and the size of the compressed data packet being less than or equal to the predetermined hysteresis bit value,
  a summation of the subsequent SPS TBS and the predetermined hysteresis bit value being less than or equal to the current SPS TBS, and
  a difference between the subsequent SPS TBS and the predetermined hysteresis bit value being greater than or equal to the current SPS TBS.

17. The system of claim 11, wherein the at least one processor is further configured to execute the instructions to determine whether to adjust the current SPS TBS by determining to not adjust the current SPS TBS based on the data packet being at least one of:
  a packet data convergence protocol (PDCP) control packet;
  a robust header compression (RoHC) feedback packet; and
  a silence indicator descriptor (SID) packet.

18. The system of claim 11, wherein the subsequent SPS TBS is determined based on a summation of the current SPS TBS multiplied by a first percentage value and the size of the compressed data packet multiplied by a second percentage value.

19. The system of claim 18, wherein the first percentage value is greater than the second percentage value.

20. A non-transitory computer-readable storage medium storing instructions that, when executed by at least one processor, cause the at least one processor to:
  initialize a current SPS transport block size (TBS);
  compress a data packet;
  determine whether to adjust the current SPS TBS based on a size of the compressed data packet; and
  adjust a value of the current SPS TBS to be a value of a subsequent SPS TBS that is less than the current SPS TBS based on determining to adjust the current SPS TBS.

* * * * *